United States Patent [19]

Pardo et al.

[11] 4,062,601

[45] Dec. 13, 1977

[54] SELF-CONTAINED MODULAR PIVOT, NOTABLY FOR ROBOTS

[75] Inventors: Pierre Pardo; François Pruvot, both of Meudon la Foret, France

[73] Assignee: Sofermo, Meudon la Foret, France

[21] Appl. No.: 698,890

[22] Filed: June 23, 1976

[30] Foreign Application Priority Data

June 24, 1975 France .................................. 75.19646

[51] Int. Cl.² ................................................ F16C 7/00
[52] U.S. Cl. ..................................... 308/2 R; 74/256; 74/380
[58] Field of Search .................. 308/2 R, 2 A; 74/63, 74/380, 251, 256

[56] References Cited

U.S. PATENT DOCUMENTS

| 3,246,890 | 4/1966 | Ormond | 308/2 R X |
| 3,253,671 | 5/1966 | Fielding | 308/2 R UX |
| 3,514,141 | 5/1970 | Suddarth et al. | 308/2 R X |

*Primary Examiner*—Joseph F. Peters, Jr.
*Assistant Examiner*—Gene A. Church
*Attorney, Agent, or Firm*—Fleit & Jacobson

[57] ABSTRACT

A self-contained modular pivot mechanism notably for automation and robot structures to enable a second machine element to perform any desired movement of rotation in relation to a first machine element through a distortion-wave harmonic reduction gear driven from a hydraulic motor secured through a shaft to the device driving said gear.

4 Claims, 3 Drawing Figures

SELF-CONTAINED MODULAR PIVOT, NOTABLY FOR ROBOTS

BACKGROUND AND SUMMARY OF THE INVENTION

This invention relates in general to articulations or like pivot means and has specific reference to a self-contained modular pivot intended for use notably in various mechanisms, especially in robots and the like.

Most hitherto known robots and mechanisms comprise pivot means. However, these pivot means are seldom designed and constructed in the form of self-contained structures, but rather as components that cannot be separated from an assembly.

This technique is objectionable as it has several inconveniences, the main ones being:

the fact that the mechanism or robot utilizing such pivot means is a permanent structure so that it is applicable only in well-defined cases. If it is contemplated to extend its possible uses, it will readily occur that the only solution consists in constructing another robot, generally completely different from the initial one, so that the same problem arises each time;

the fact that the pivot or pivots designed for a specific application are well-adapted, or supposed to be well-adapted, for the mechanism on which they are mounted. This does not ensure that their cost and over-all dimensions have been minimized;

the fact that a pivot incorporated in a given member is hardly likely to evolve from a purely technical point of view. Indeed, except in case of faulty operation, this pivot is preserved as such throughout the useful like of the product on which it is mounted. Therefore, it will behave in a quite ordinary way and its performance will be behind the actual and present technological possibilities and trends.

It is the essential object of the present invention to avoid these inconveniences by providing a self-contained modular pivot. Nowadays, new techniques are provided to separate a device into its elementary functions, each thus isolated function leading to a modular construction having minimum over-all dimensions and the best possible technological efficiency of performance, each module being coupled, linked or connected to another module performing the same function or a different function, through standard means, or variable dimensions, whereby economical and standardized structures well adapted for each purpose can be obtained.

Each separate function may on the other hand be performed by several modules of different sizes, each module having a predetermined capacity, whereby a wide range of requirements can be met by using a relatively small number of component elements.

In addition, by preserving (in most cases without difficulty) standard over-all dimensions and coupling means for connecting the standard modules to other standard modules, it is clear that each module can evolve with the technology while remaining constantly interchangeable with the preceding module.

According to this invention, the self-contained pivot means for interconnecting or coupling two machine elements adapted to perform any desired rotational movement in relation to each other about an axis of rotation comprises a first flange or plate secured to the first machine element, said first flange having centered and locked in relation thereto the internally toothed annulus of a reduction gear rigid with a tubular member concentric thereto; a pair of rolling-contact bearings secured the one between said internally toothed annulus and said first flange, the other to the opposite end of said tubular member, said rolling-contact bearings are centered through their inner races and have their play adjustable by means of an adjustment device rigid with said tubular member, the outer race of said rolling-contact bearings is adapted to center and lock in the axial direction a second tubular member rotatably rigid with the other machine element, said second tubular member is closed at its end opposite said first flange by a second flange to which the motor driving said pivot and said reduction gear meshing with the internally toothed annulus secured to said first flange are fastened.

According to a first feature of this invention, the reduction gear is of the so-called "distortion-wave harmonic drive" type.

According to another characteristic feature of this invention the self-contained pivot incorporates all the necessary mechanical components, including the power control and the position coder for measuring the relative angular position of the two machine elements.

Other features of this invention will appear as the following description proceeds.

BRIEF DESCRIPTION OF THE DRAWINGS

This description is given by way of illustration, not of limitation, with reference to the attached drawing of which

DETAILED DESCRIPTION OF THE INVENTION

Figure 1:
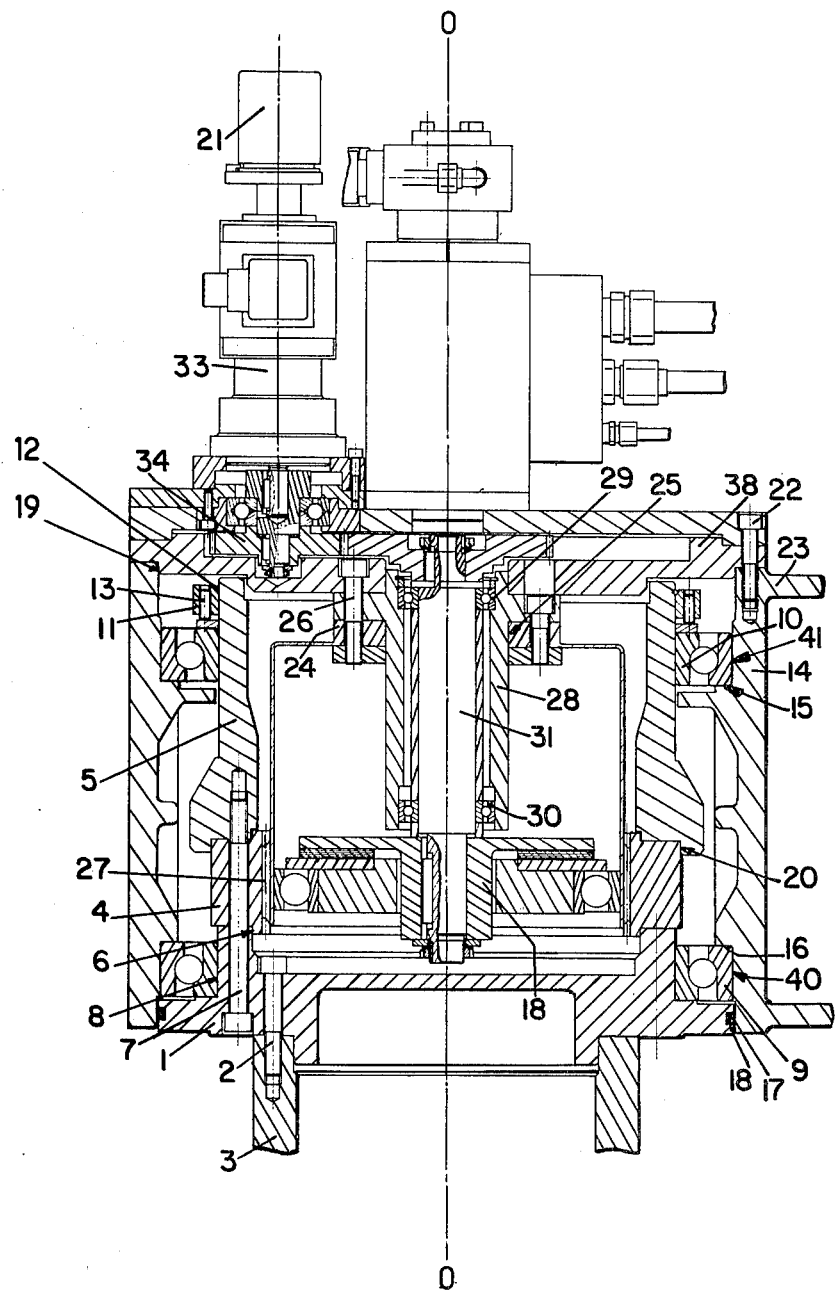
FIG. 1 illustrates a typical form of embodiment of the invention, shown in section taken along the axis 0 — 0 of the device.

In this example, the self-contained pivot comprises a flange or plate 1 secured by screws 2 to a tubular member 3 which is an integral part of the machine or robot.

The internally toothed annulus 4 of a reduction gear of the distortion-wave harmonic drive type is secured to said flange 1, the axis of rotation of this reduction gear being coincident with the axis 0 — 0 shown in dash and dot line in the figure and constituting the axis of rotation of the self-contained pivot according to this invention. The reduction gear carries a tubular member of revolution 5 also centered symmetrically to said axis 0 — 0.

The tubular member 5 is superposed to the internally toothed annulus 4 and both are centered by means of cylindrical surfaces 6 and 20, and assembled by means of screws 7. Centered to the outer cylindrical surface 8 of flange 1 is a rolling-contact bearing 9 disposed between said flange 1 and the body 14 of the device. Similarly, the tubular member of revolution 5 has fitted to its end opposite the internally toothed annulus 4 of said reduction gear another rolling-contact bearing 10 of which the play can be adjusted by means of a device comprising a ring 11 held against translation by a spring ring 12 and formed with spaced peripheral holes engaged by corresponding screws 13.

The body 14 of general tubular configuration surrounds the above-described mechanism coaxially to 0 — 0 and is centered on the outer diameters 40 and 41 of ball bearings 9 and 10. This body 14 is formed with shoulders 15 and 16 so that it can rotate about the assembly comprising the flange 1, internally toothed annulus 4 and tubular member 5 without any radial or axial play, provided that the screws 13 have been properly tightened.

A sealing ring 17 disposed in a groove 18 formed in the outer peripheral wall of flange 1 is in rotary contact with tubular member 14 for sealing the pivot against the ingress of foreign substances. At the end of said tubular member 14 which is opposite to said flange, a cover 38 centered by a shoulder 19 to the tubular body 14 is secured to the latter by means of screws 22, thus imparting the necessary fluid-tightness to the pivot mechanism.

Therefore, the movable portion of the pivot according to this invention comprises the tubular body 14 and the cover 38 rotatably mounted by means of ball-bearings 9 and 10 on the fixed portion comprising the flange 1, internally toothed annulus 4 and tubular member 5.

If it is desired to cause an arm to pivot in lieu of two coaxial members in relation to each other, this arm, as exemplified at 23, may be fastened to, or formed integrally with, the tubular body 14 through any suitable means not included in the present invention.

The bell-shaped member 24 of the reduction gear is secured to said cover 38 in the inner space of tubular member 5. This bell 24 is centered and held against rotation on said cover 38 by a centering surface 25 and screws 26, respectively. Its externally toothed portion 27 is in meshing engagement with the inner teeth of annulus 4. A support 28 is also centered and secured to the same cover 38 for guiding by means of rolling-contact bearings 29, 30 a shaft 31 supporting the member 32 for driving the reduction gear of which the description is not deemed necessary since it is well known to anybody conversant with the art. Said shaft 31 is rotatably driven from a hydraulic motor 33 comprising at its opposite end a position coder 21, said motor 33 being secured to the cover 38.

The motor 33 drives the shaft 31 via a reduction gear 34 but the latter is not compulsory.

According to a modified form of embodiment, not shown in the drawing, the motor 33 may be incorporated in the volume encompassed by the tubular body 14 and in this case the motor shaft will carry directly the reduction-gear driving member 32.

It is thus clear that the pivot according to this invention has particularly reduced over-all dimensions, both axially and radially. Moreover, no external support means are required for the motor since the motor casing revolves in relation to the structure or element 3, the latter being rigidly secured to the cover 38. The only consequence to be taken into account is that the data obtained from the coder 21 relate to the respective angular positions of said element 3 which are in a ratio other than the reduction ratio of the reduction gear 4, 27, 32 and of the additional reduction gear 34 possibly interposed between the latter and the motor.

Figure 2:
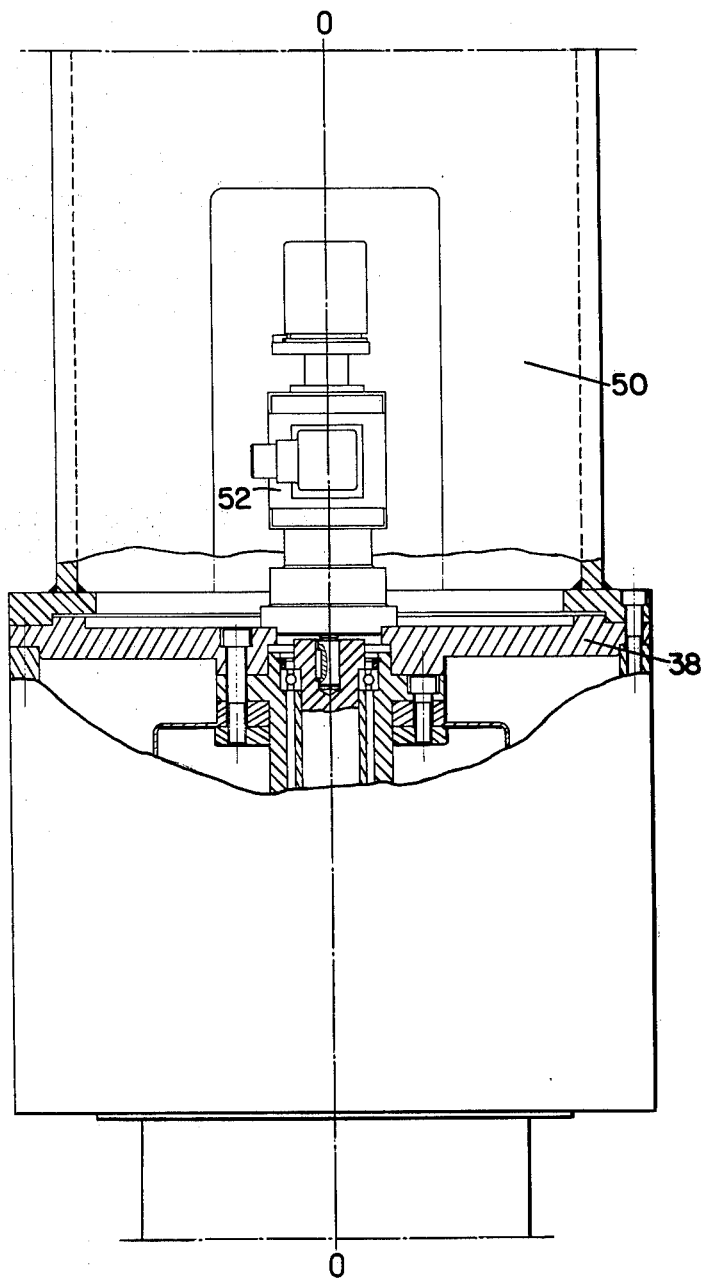
FIG. 2 illustrates an embodiment for driving a tubular device.

The above-described arrangement is particularly advantageous when it is desired to rotatably drive an arm extending substantially at right angles to the axis of rotation of the pivot. Moreover, it is clear that all the main mechanical and hydraulic components, except for the toothed annulus 4, can be disassembled without interfering with the robot structure proper, since by simply removing the cover 38, the reduction gear, the coder and the hydraulic device can also be taken down while the tubular body 14 and the arm 23 remain centered by the main ball-bearings 9 and 10. On the other hand, the above-described form of embodiment of the invention is ill-suited for driving a tubular device of the type illustrated in FIG. 2. In this case a tubular member 50 is secured to the cover 38 by means of screws 51.

Figure 3:
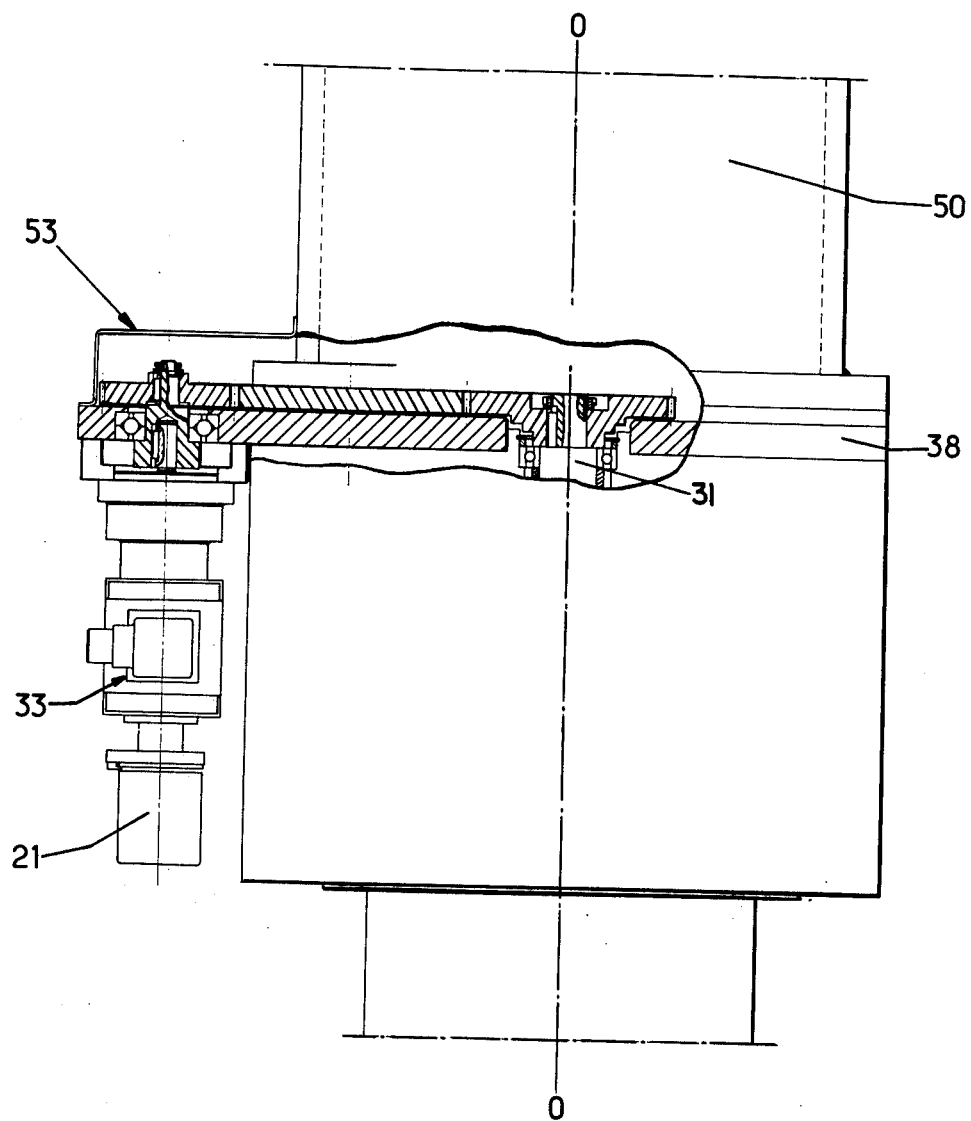
FIG. 3 illustrates a modification of FIG. 2 wherein a motor is mounted laterally.

In fact, this construction, though desirable, is inefficient for the hydraulic motor, the servo valve, and the coder are enclosed in the tubular member 50 and therefore cannot be serviced unless the tubular member 50 is removed or an access aperture such as 52 is formed through the wall of said tubular member 50. Of course, this solution may be adopted within the scope of this invention as disclosed in the foregoing, provided only that the aperture 52 has dimensions sufficient to permit an easy access to the screws securing the engine to the assembly, and also to the coder. FIG. 3 illustrates a modified construction whereby this inconvenience can be minimized. The hydraulic motor and the coder are mounted laterally, preferably on a lateral extension of the cover 38. In this arrangement the motor 33 drives the shaft 31 through transmission means consisting, according to the torques involved and also to the necessary degree of precision, of a chain, belt, gears or any other suitable mechanism. It is obvious that with this arrangement the aperture to be provided through the wall of the tubular body 50 may be relatively small, since it is only required that the drive means leading to shaft 31 extends therethrough, the necessary fluid tightness being obtained by means of a cover such as 53.

It may be emphasized that the assembly most likely to suffer from a mechanical failure comprises the motor, the drive and the coder, and that this assembly is accessible without having to take down any component. Moreover, the over-all dimensions in the direction of the axis 0 — 0 of the pivot according to this invention is reduced considerably in comparison with prior art structures.

Although various forms of embodiment of this invention have been described hereinabove and illustrated in the accompanying drawing, it will readily occur to those conversant with the art that various modifications and changes may be brought thereto without departing from the scope of the invention as set forth in the appended claims.

What is claimed as new is:

1. A self-contained modular pivot mechanism for coupling first and second machine elements adapted to be rotated through any angle in relation to each other about an axis of rotation, comprising first and second portions connected to said first and second machine elements respectively, said first portion comprising a first tubular member, an internally toothed annulus of a reduction gear, means for rigidly connecting said first tubular member with said annulus, means for centering and locking said annulus against axial movement on a first flange, said first flange secured to the first machine element, said second portion comprising a second tubular member, a pair of rolling-contact bearings, means for disposing said pair of rolling-contact bearings between said first and second tubular members at their opposite ends to center and dispose coaxially said second tubular member in relation to said first tubular member, said second portion further comprising a second flange, means for detachably securing said second flange to said second tubular member at the portion thereof opposite to said first flange, a pivot driving motor, means for securing said pivot driving motor to said second flange, and wherein said second machine element is secured to said second portion of said pivot mechanism, whereby access can be had to said motor independently of the connection between the two machine elements.

2. A self-contained modular pivot mechanism according to claim 1, further comprising an adjustment device means mounted on said first tubular member for controlling the play of one of said rolling-contact bearings.

3. A self-contained modular pivot mechanism according to claim 1, wherein said second machine element secured to the second portion of the pivot mechanism extends at right angles to the axis of rotation of the pivot mechanism, a position coder secured to said driving motor, and means for securing said driving motor and said position coder to the second flange, externally of the pivot structure.

4. A self-contained modular pivot mechanism according to claim 1, wherein said second machine element secured to the second portion of the pivot mechanism extends parallel to the axis of the first portion thereof, a position coder secured to said driving motor, and means for securing said driving motor and said position coder laterally to an extension of said second flange.

* * * * *